United States Patent [19]

Le et al.

[11] Patent Number: 4,727,378

[45] Date of Patent: Feb. 23, 1988

[54] METHOD AND APPARATUS FOR PURGING AN INK JET HEAD

[75] Inventors: Hue P. Le, Aloha; Jeffrey J. Anderson; Guenther W. Wimmer, both of Portland; Monte J. Rhoads, Aloha; Ted E. Deur, Vernonia, all of Oreg.

[73] Assignee: Tektronix, Inc., Beaverton, Oreg.

[21] Appl. No.: 884,846

[22] Filed: Jul. 11, 1986

[51] Int. Cl.[4] .......... G01D 15/16

[52] U.S. Cl. .......... 346/1.1; 346/140 R

[58] Field of Search .......... 346/140, 1.1

[56] References Cited

U.S. PATENT DOCUMENTS

| | | | |
|---|---|---|---|
| 3,974,508 | 8/1976 | Blumenthal | 346/140 |
| 4,106,032 | 8/1978 | Miura | 346/140 |
| 4,184,169 | 1/1980 | Taylor | 346/140 |
| 4,312,010 | 1/1982 | Doring . | |
| 4,367,479 | 1/1983 | Bower | 346/140 |
| 4,380,018 | 4/1983 | Andoh et al. . | |
| 4,380,770 | 4/1983 | Maruyama | 346/140 |
| 4,466,005 | 8/1984 | Yoshimura . | |
| 4,518,973 | 5/1985 | Tazaki . | |
| 4,518,974 | 5/1985 | Isayama . | |
| 4,533,569 | 8/1985 | Bangs . | |
| 4,609,925 | 9/1986 | Nozu | 346/140 X |

FOREIGN PATENT DOCUMENTS 106871 8/1981 Japan .

OTHER PUBLICATIONS

Janeway, III; D. L.; Bubble Scrubbing in an Ink Jet Printing Head; IBM TDB, vol. 22, No. 2, Jul. 1979, pp. 501-502.

NASA Tech Brief, vol. 7, No. 2, Item No. 53, from JPL Invention Report NPO-15334/5046, Published in 1983.

*Primary Examiner*—Joseph W. Hartary

*Attorney, Agent, or Firm*—John D. Winkelman; David P. Petersen

[57] ABSTRACT

An ink jet head 10 has an ink chamber 14 which receives ink from an ink inlet passageway 38. Pressure pulses applied to the ink chamber cause the ejection of ink drops from an ink drop forming orifice 23 and toward printing medium. A purging outlet 41 communicates with the ink chamber through a purging passageway 40. During purging, ink flows in a vortical path through the ink chamber 14 from the ink inlet passageway 38 to the purging outlet passageway 40. This sweeps air bubbles and contaminants from the ink chamber walls and removes them from the ink chamber. Ink pressure within the ink chamber 14 may be elevated to increase the flow of ink during purging. Also, a negative pressure may be applied to the purging outlet during purging. Variable frequency pressure pulses may also be applied to the ink chamber to assist the purging process.

18 Claims, 7 Drawing Figures

METHOD AND APPARATUS FOR PURGING AN INK JET HEAD

TECHNICAL FIELD

This invention relates to ink jet heads for ink jet printers, and in particular to a method and apparatus for purging air bubbles and contaminants from ink jet heads.

BACKGROUND OF THE INVENTION

Ink jet printers having one or more ink jet heads for projecting drops of ink onto paper or other printing medium to generate graphic images and text have become increasingly popular. To form color images, ink jet printers with multiple ink jet printing heads are used, with each head being supplied with ink of a different color. These colored inks are then applied, either alone or in combination, to the printing medium to make a finished color print. Typically, all of the colors needed to make the print are produced from combinations of cyan, magenta and yellow inks. In addition, black ink may be utilized for printing textual material or for producing true four-color prints.

In a common arrangement, the print medium is attached to a rotating drum, with the ink jet heads being mounted on a traveling carriage that traverses the drum axially. As the heads scan paths over the printing medium, ink drops are projected from a minute external orifice in each head to the medium so as to form an image on the medium. A suitable control system synchronizes the generation of ink drops with the rotating drum.

In one basic type of ink jet head, ink drops are produced on demand. An exemplary drop-on-demand ink jet head is illustrated in U.S. Pat. No. 4,106,032 of Miura et al. The Miura et al. ink jet head has a two compartment ink chamber comprised of an inner horn compartment and an outer ink compartment which communicate with one another through a connecting channel of restricted cross section. Ink is delivered to the outer ink compartment of the ink jet head. Whenever a drop of ink is needed, an electric pulse is applied to a piezoelectric crystal, causing the crystal to constrict. As a result, because the crystal is in intimate mechanical contact with ink in the horn compartment, a pressure wave is transmitted through the ink chamber. In response to this pressure wave, ink flows from the outer ink compartment and through an ink orifice passageway in an ink chamber wall and forms an ink drop at an internal ink drop-forming orifice outlet located at the outer surface of the ink chamber wall. The ink drop passes from the ink drop-forming orifice outlet and through an air chamber toward a main external orifice of the ink jet head. This latter orifice is aligned with both the internal orifice and the connecting channel and also leads to the printing medium. Air under pressure is delivered to the air chamber and entrains the drop of ink in a generally coaxial air stream as the ink drop travels through the air chamber. This air stream increases the speed of the drops toward, and the accuracy of applying the drops to, the print medium.

Such ink jet heads, as well as ink jet heads of the non-air assisted type, can easily become clogged with contaminants. Also, air bubbles within these ink jet heads can interfere with or block their operation. There are many potential sources of such air bubbles and contaminants. For example, air bubbles may be introduced into the ink inside the ink chamber through the ink orifice passageway. Also, air bubbles may be generated in the ink as temperature or pressure changes. For example, during transportation or shipment of an ink jet head at high altitudes by airplane or operation of such an ink jet head at high altitude locations.

Various prior art devices have been developed for removing air bubbles and contaminants from ink jet heads. For example, U.S. Pat.No. 4,466,005 of Yoshimura discloses an air bubble removing system for an ink jet head which operates by applying purging drive signals of various fixed frequencies and various voltages to a piezoelectric crystal utilized to drive the ink jet head. These signals break up air bubbles to facilitate their discharge from the jet head. In the example described in this Patent, the purging drive signals are one kilohertz, one hundred and twenty-five hertz and four hertz. In addition, an ink jet printer commercially available from Tektronix, Inc. of Beaverton, Oreg., model number 4692, also employs this technique of applying stepped frequency purging signals. In the 4692 apparatus, purging signals of fifteen, twenty and thirty kilohertz are applied to a piezoelectric crystal to assist in removal of air bubbles from the ink chambers of ink jet heads. In both the Tektronix 4692 ink jet printer and apparently in the Yoshimura system, contaminants are discharged through a restricted orifice. During discharge, these contaminants can become lodged in the orifice and disable the ink jet head. It is known that air bubbles vibrate when subject to pressure pulses at the resonant frequency of the air bubbles. It is also known that such oscillations assist in separating the air bubbles from the wall of a chamber. For example, this is described in an article entitled "Acoustic Methods Remove Bubbles From Liquids," *NASA Tech Brief,* Vol. 7, No. 2, Item No. 53, published in 1982 and also in a Jet Propulsion Laboratory Invention Report, NPO-15334/5046, published in July 1983. In the *NASA Tech Brief,* a disclosure which does not mention ink jet heads, a method of removing bubbles from a liquid bath is described. In this method, the bath is swept with frequency signals, generated by a voltage controlled oscillator, over a range of from 0.5 kilohertz to forty kilohertz.

In another prior art approach, U.S. Pat. No. 4,533,569 of Bangs discloses an ink jet head in which an interior surface of a glass ink jet nozzle is cleaned with a chemical solution to minimize air bubble formation and to facilitate purging of air bubbles from the nozzle. Also U.S. Pat. No. 4,518,974 of Isayama discloses a system for removing air bubbles in which an air-ink boundary is drawn temporarily within a nozzle chamber and toward an ink supply side of the chamber. When this occurs, a transfer of air within the nozzle to the atmosphere is permitted. As still another approach, U.S. Pat. No. 4,518,973 of Tazaki discloses a suction recovery apparatus which applies a negative pressure to a nozzle orifice outlet for removal of air bubbles and contaminants from the nozzle. These approaches all suffer from a number of limitations.

In addition to the problem of purging bubbles and cleaning contaminants from ink jet heads during operation, it is difficult to initially fill ink jet heads with ink without introducing air bubbles into the ink within the ink jet head. In a common approach, such as utilized with the Tektronix 4692 ink jet printer, ink jet heads are initially filled as follows. First, a vacuum is drawn on the ink chamber of the ink jet head in order to remove air from the ink chamber. Then, the ink chamber is filled with water which is eventually replaced with ink. Typically, these ink jet heads have two ink chamber compartments, such as in U.S. Pat. No. 4,106,032 of Muir et al. In addition, these ink jet heads are provid a port leading to the horn chamber for use in filling the ink jet head. Following filling, a screw is utilized to close this port. This ink jet head filling is performed while the ink jet head is removed from an ink jet printer and typically is extremely time consuming. It should be noted that it is extremely difficult to remove air bubbles which happen to be present in the horn chamber during such a filling operation. As another example of this approach, FIGS. 13 and 14 of U.S. Pat. No. 4,380,018 of Andoh et al. discloses a two compartment ink chamber with an ink filling port. In the FIG. 13 form, a passage is provided between an outer ink chamber and an inner horn chamber. The ink filling port communicates with this passageway. A screw is utilized to plug this port following filling. During normal operation of this ink jet head, ink is supplied to the outer compartment. The FIG. 14 embodiment eliminates the passageway between the outer ink compartment and horn compartment. However, like the FIG. 13 form, the ink filling port is plugged during normal operation of the ink jet head and ink is supplied to the outer ink compartment.

Also, U.S. Pat. No. 4,312,010 of Doring discloses a non-air assisted ink jet head having a flat conical single compartment fluid chamber. Because of the shape of this chamber, during filling with ink, an air bubble is enclosed by the ink and forced out through an orifice at the apex of the conical ink chamber.

Although these various approaches for filling ink jet heads and for purging air bubbles and contaminants from the ink jet heads are known, a need exists for an improved method and apparatus for this purpose.

SUMMARY OF THE INVENTION

A method and apparatus is disclosed for purging air bubbles and contaminants from ink chambers of various types of ink jet heads. In general, an ink jet head in accordance with the invention has an ink chamber which is supplied with ink from an ink inlet passageway. In response to pressure pulses applied to ink within the ink chamber, ink drops are ejected from an ink drop forming orifice of the chamber and toward printing medium. A purging outlet communicates with the ink chamber through a purging passageway. This purging passageway is separate from the restricted ink drop-forming orifice outlet. Bubbles and contaminants are removed through this purging passageway during a purging operation. During a purging operation, the purging outlet is opened. When this happens, ink flows from the ink supply passageway to the purging passageway and carries contaminants and air bubbles from the ink chamber.

As a more specific feature of the invention, the ink inlet is arranged to introduce ink tangentially into the ink chamber. The ink then flows in a vertical or cyclone-like path through the ink chamber from the ink inlet passageway to the purging outlet passageway. This sweeps air bubbles and contaminants from the ink chamber walls. In addition, this ink flowing through the ink chamber during purging in this manner minimizes stagnation areas or low velocity ink flow regions within the ink jet head. Thus, areas of low dynamic pressure are minimized and the effectiveness of purging is enhanced. In addition, the increased flow velocities of ink through the ink chamber during purging are permitted because the path of flow from the ink inlet passageway to the purging passageway does not pass through a restricted orifice.

As another aspect of the invention, the pressure of ink delivered to the ink chamber may be elevated during purging to increase the flow of ink during the purging operation. In addition, or alternately, a negative pressure may be applied to the purging outlet during the purging operation to assist in purging.

As another aspect of the invention, an ink jet head may be wetted by ink or other fluid and then purged as explained above. Because the walls of the ink chamber are wet, removal of air bubbles is facilitated as the bubbles are separated from, and do not adhere to, the chamber walls. The ink chamber is typically wetted prior to initial filling or has become wet during normal operation of the ink jet head.

As a further aspect of the invention, during purging, a variable frequency signal may be applied to a piezoelectric crystal used to drive the ink jet head. Such a signal assists in breaking up air bubbles and dislodging them from the ink chamber walls so that they can be more easily removed from the ink chamber.

It is accordingly one object of the invention to provide an improved method and apparatus for purging bubbles and contaminants from ink jet heads.

Still another object of the present invention is to provide such a method and apparatus which is capable of purging ink jet heads without removing the ink jet heads from an ink jet printer.

A further object of the invention is to provide a purging method and apparatus which requires little time and minimal ink to accomplish a purging operation.

Another object of the present invention is to provide an ink jet head purging method and apparatus which is applicable to a wide variety of ink jet heads, including single and dual ink chamber ink jet heads and air assisted and non-air assisted drop-on-demand ink jet heads.

Still another object of the present invention is to provide an ink jet head which facilitates initial filling of ink jet heads, purging and cleaning of the ink jet heads during use, and storage of the ink jet heads by permitting the easy removal of air bubbles generated during such operations.

These and other objects, features and advantages of the present invention will become apparent with reference to the following description and drawings.

DETAILED DESCRIPTION OF PREFERRED EMBODIMENTS

Figure 1:
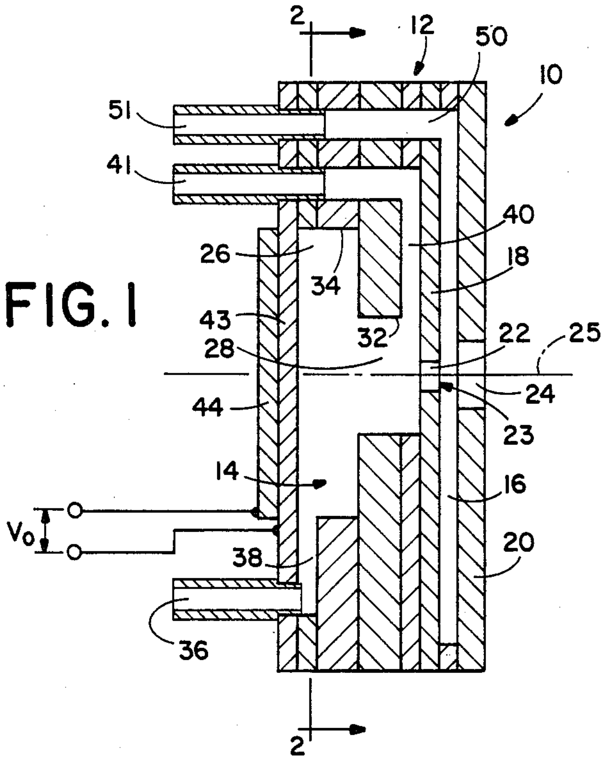
FIG. 1 is a vertical sectional view of one form of an ink jet head in accordance with the present invention.
Figure 2:
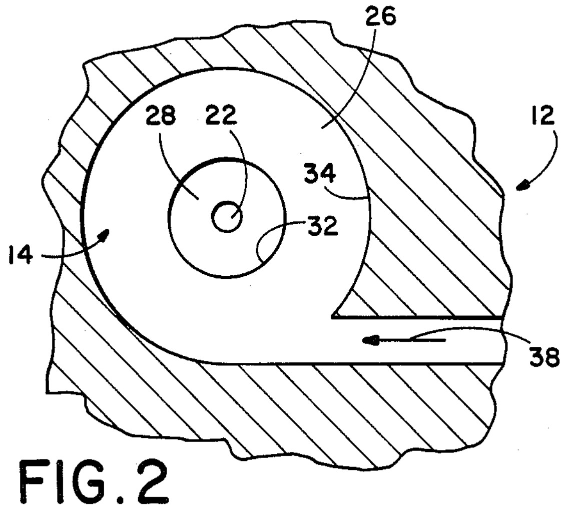
FIG. 2 is a vertical sectional view of a portion of the ink jet head of FIG. 1, taken generally along lines 2—2 of FIG. 1.
Figure 3:
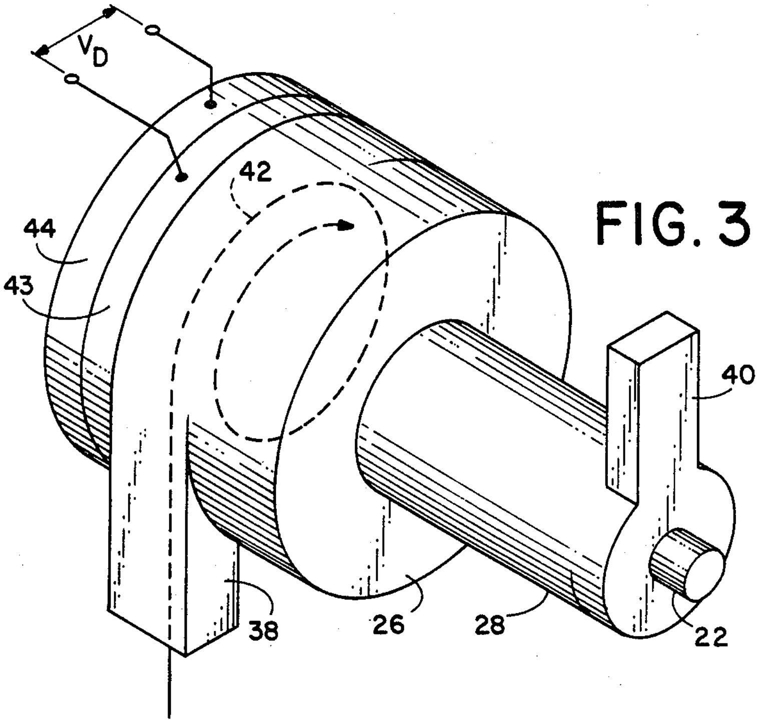
FIG. 3 is an illustration of the shape of the single compartment ink chamber of the ink jet head of FIG. 1.

With reference to FIGS. 1–3, an ink jet head 10 includes a body 12 within which a single compartment ink chamber 14 and an air chamber 16 are provided. The ink chamber 14 is separated from the air chamber 16 by an ink chamber wall 18. Also, the air chamber 16 is closed by an air chamber wall 20. The ink chamber 14 communicates with the air chamber through an internal ink orifice passageway 22, which is provided through the ink chamber wall 18. The ink orifice passageway 22 opens to air chamber 16 through an internal ink drop-forming orifice outlet 23. An external ink jet orifice 24 passes from the air chamber to the exterior of the ink jet head 10. Ink jet orifice 24 is axially aligned with ink orifice passageway 22 and orifice outlet 23, as indicated by axis 25.

In the FIG. 1 form of the invention, ink chamber 14 is comprised of two sections 26, 28 of generally circular cross section. Section 28 is positioned adjacent to the wall 18 and ink orifice passageway 22 and is also bounded by an interior wall 32 of ink jet head body 12. Section 26 is of greater diameter than section 28, and is bounded by an interior wall 34. The sections 26, 28 are symmetric about the axis 25.

Ink under pressure is delivered to an ink receiving inlet 36, flows through an ink passageway 38, and fills the ink chamber 14 within the ink jet head.

For purposes of facilitating the purging of contaminants and air bubbles from the ink jet head, as explained in greater detail below, ink is directed into the base of ink chamber 14 so as to be tangential to the wall 34. Also, an ink chamber purging outlet 41, communicating through a purging passageway 40 with chamber section 28 adjacent the interior surface of wall 18, is provided for use in selectively purging air bubbles and contaminants from ink chamber 14. Ink inlet passageway 38 and purging passageway 40 are positioned so that ink travels in a non-linear path between the inlet and purging outlet during the purging process. As explained below, this assists in sweeping air bubbles and contaminants from the ink chamber. More specifically, as indicated generally by arrow 42 in FIG. 3, ink travels in a vortical or cyclone-like path between the ink inlet passageway 38 and the purging passageway 40.

The end of ink chamber 14 opposite ink orifice outlet 22 is closed by a flexible membrane or diaphragm 43, such as of stainless steel. A piezoelectric crystal 44, together with membrane 43, comprises one form of a pressure pulse generating actuator. In response to electrical pulses, a pressure wave is transmitted through the ink chamber 14. This causes the ejection of an ink droplet from the ink drop-forming orifice outlet 23 and toward the external orifice 24.

Pressurized air is delivered to an air inlet 51 of the ink jet head 10 and flows through a passageway 50 to the air chamber 16. Air is distributed about the circumference of the ink jet head between the outer surface of ink chamber wall 18 and the inner surface of the air chamber wall 20. More specifically, air flows inwardly from all directions through the air chamber 16 toward the center of the ink jet head. As air approaches the center of the head, it changes direction and flows outwardly through the external orifice 24. This air flow accelerates ink drops generated at ink drop-forming orifice 23 in response to pressure pulses and assists in carrying them outwardly from the ink jet head. As a result, uniform and symmetric ink drops are generated by the ink jet head. These drops travel through the external orifice 24 and toward the printing medium. Although not shown in FIG. 1, a projection, such as of conical shape, may be positioned on the outer surface of ink chamber wall 18. In such a case, ink orifice passageway 22 would pass through this projection and the ink orifice outlet 23 would be located at the top of the projection. This projection assists in deflecting the air outwardly through the external orifice 24.

In a typical application, an exemplary air pressure is thirty inches of water and an exemplary ink pressure is twenty-five inches of water. Thus, a typical pressure differential between the air and ink pressures is five inches of water. However, pressure differentials of from approximately three to ten inches of water are suitable for optimum operation.

Figure 4:
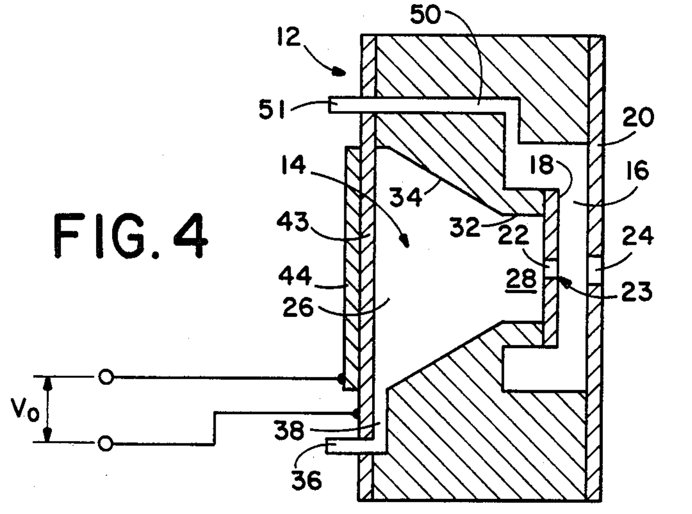
FIG. 4 is a vertical sectional view of an alternate embodiment of an ink jet head in accordance with the present invention.

The FIG. 4 form of ink jet head is much like the FIG. 1 form. Consequently, components of the FIG. 4 ink jet head are designated with the same number as corresponding components of the FIG. 1 ink jet head. In general, the FIG. 4 form of the invention eliminates the optional purging outlet. In addition, ink chamber section 26 of the FIG. 4 form of ink chamber 14 is generally of frustoconical shape. However, the chamber 14 may be cylindrical or of other shapes.

The FIG. 1 form of ink jet head may be manufactured by simply laminating together sheets of material which have been drilled or fabricated with appropriate openings. Because of this relatively simple manufacturing technique, it is extremely easy to align ink drop-forming orifice 23 and the external orifice 24. It is also easy to manufacture arrays of multiple ink jet heads. In comparison, the ink jet head of FIG. 4 typically includes some cast or machined parts.

Ink jet heads in accordance with the present invention are capable of operation at an extremely high print operating or ink drop-production rates, such as from zero to twenty kilohertz. At the same time, the complexities and difficulties introduced by having a drop-on-demand ink jet head with a two compartment ink chamber separated by a restricted orifice, are avoided. To achieve this result, an ink jet head in accordance with the invention is designed such that the natural frequencies of the components of the head are greater than the maximum desired operating frequency of the head. Furthermore, the natural frequencies of each of the components are sufficiently different from each other to prevent intercoupling of these elements. Such intercoupling could block the ink drop-production. In addition, the ink supply passageway 38 is designed to have a cross-sectional area that is large enough to allow the supply of ink into the ink chamber 14. At the same time, the cross-sectional area of ink inlet passageway 38 is small enough to prevent the natural frequency of the ink in the ink inlet passageway from significantly interfering with pressure pulses generated by the piezoelectric crystal 44 within the ink chamber 14. That is, the frequency of ink in the ink inlet does not significantly alter the damping ratio, magnitude, or frequency of the pressure pulses in the ink chamber. Typically, the purging outlet 41 is about the same size as the ink inlet. However, the size of the ink inlet has a greater effect on the performance of the ink jet head because ink is supplied through this inlet during drop formation.

In connection with this design, the ink orifice passageway and ink chamber are sized such that the natural frequency of ink in the ink passageway 22 is equal to or greater than seventy-five percent of the maximum operating frequency. Furthermore, to prevent drop resonance, the ink jet head is typically designed such that the natural frequency of ink in the ink orifice passageway 22 is outside of the range of from ninety to one hundred and ten percent of the maximum operating frequency. This natural frequency is primarily dependent upon the dimensions of the ink orifice passageway 22 and on the overall volume of the ink chamber.

In addition, the actuator assembly comprised of piezoelectric crystal 44 and diaphragm plate 43, should have a natural frequency of greater than two hundred and fifty percent of the maximum operating frequency of the ink jet head. Preferably, the natural frequency of this assembly should be between one hundred kilohertz and two hundred kilohertz assuming an ink jet head operable at up to twenty kilohertz is desired.

Also, when the ink chamber is filled with ink, the axial acoustic frequency, in the direction of axis 25 and dependent upon the axial distance between the diaphragm plate 43 and ink chamber wall 18, should preferably be from four hundred kilohertz to eight hundred kilohertz. This again assumes that an ink jet head operable at up to twenty kilohertz is desired. Also, the natural frequency of the ink chamber wall 18, for an ink jet head operable at up to twenty kilohertz, should preferably be greater than or equal to eight hundred and fifty kilohertz.

Carrying this further, the ink orifice, passageway is sized such that the natural resonant frequency of ink inside the ink orifice passageway is greater than sixteen kilohertz. In addition, the actuator assembly typically generates a peak positive pressure within the ink chamber which is from about five pounds per square inch to about twenty pounds per square inch. Also, the actuator assembly generates a peak negative pressure within the ink chamber which is from about negative five pounds per square inch to about negative two pounds per square inch.

It will of course be appreciated by those skilled in the art that some deviation from the above frequencies still results in a satisfactorily operable jet head. Again, however, in general the natural frequencies of a the components of the single ink chamber ink jet head should be greater than the maximum operating frequency and should also be isolated from one another.

To further describe the invention, and with reference to FIG. 1, the following table lists typical and preferable dimensions for the components identified in this figure. It should be noted that the column identified as "range" is not to be taken as listing the outer limits of suitable dimensions but is a range over which the most satisfactory operation of the ink jet head is believed to result. Finally, the column labeled "preferred" is the dimension for which optimal results are indicated from testing to date.

TABLE

| Element | Range | Preferred |
|---|---|---|
| A. Thickness of Piezoelectric Crystal 44 | 151 μm–411 μm | 281 μm |
| B. Thickness of Diaphragm 43 | 75 μm–261 μm | 131 μm |
| C. Cross Section of Inlet Passageway 38 | 9311 $\mu m^2$–31,311 $\mu m^2$ | |
| D. Cross Section of Outlet Passageway 40 | 9311 $\mu m^2$–31,311 $\mu m^2$ | |
| E. Ink Chamber Length (along axis 25 from Diaphragm 43 to Ink Chamber wall 18) | 761 μm–2551 μm | 1151 μm |
| F. Thickness of Ink Chamber Wall 18 | 51 μm–131 μm | 75 μm |
| G. Diameter of Ink Orifice Passageway 22 | 31 μm–71 μm | 51 μm |
| H. Width of Air Chamber 16 (from Ink Chamber Wall 18 to Air Chamber Wall 20) | 51 μm–131 μm | 71 μm |
| I. Thickness of External Air Chamber Wall 20 | 111 μm–261 μm | 151 μm |
| J. Diameter of External Orifice 24 | 111 μm–261 μm | 151 μm |

With respect to elements H throguh J above, these dimensions are like those of the comparable components ofthe drop-on-demand ink jet head shown in U.S. Patent No. 4,106,032 of Miura et al.

Figure 5:
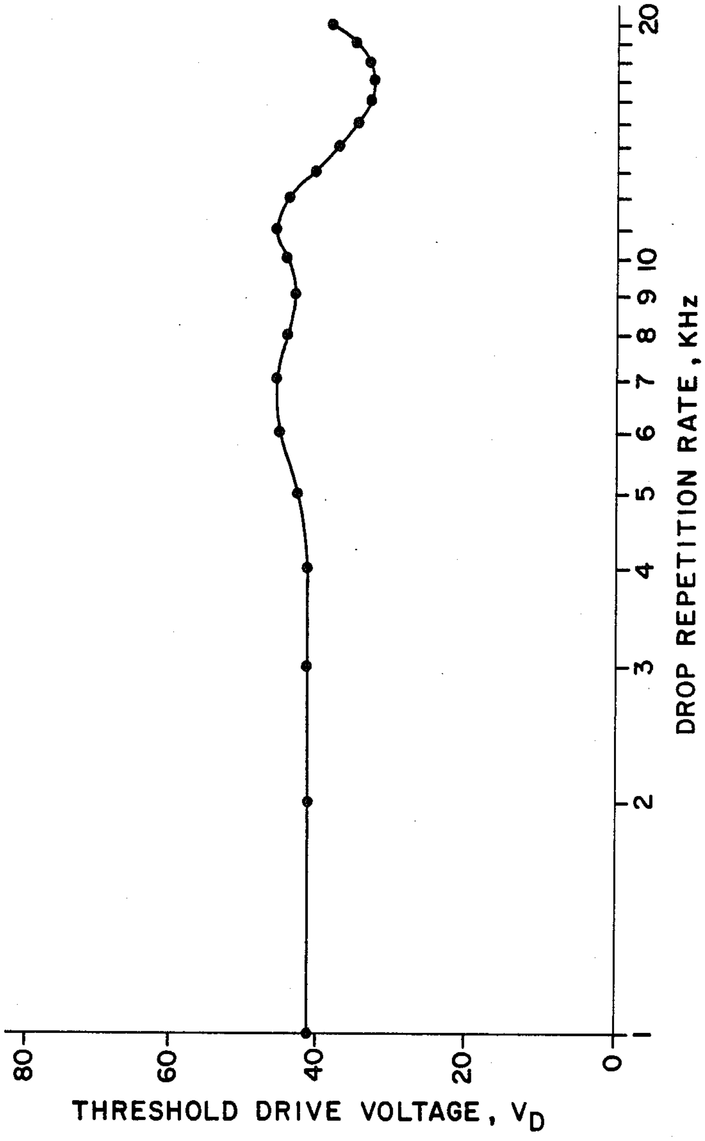
FIG. 5 is a graph plotting the threshold drive voltage applied to the actuator of the FIG. 1 ink jet head in order to generate ink drops at various drop repetition rates.

Thus, a single ink chamber air-assisted drop-on-demand ink jet head capable of operating at extremely high drop repetition rates is provided. With the ink jet head of the present invention, the drop formation process is stabilized, with one uniform dot being produced on the printing medium per pressure pulse. Moveover, with reference to FIG. 5, a relatively constant peak to peak drive voltage, $V_D$, is required to generate ink drops over a wide range of drop repetition rates. In addition, a typical peak-to-peak drive voltage required by an ink jet head of the present invention is about forty volts over the full range of drop-repetition rates, through and including twenty kilohertz. In contrast, known air assisted drop-on-demand ink jet heads typically require drive voltages which are substantially higher. Therefore, drive circuits utilized in operating ink jet heads in accordance with the present invention can be simplified, while still producing the desired results.

A method and apparatus for purging contaminants and air bubbles from an ink jet head will next be described with reference to FIGS. 6 and 7. This method and apparatus may be used in conjunction with a wide variety of ink jet heads, in addition to the ink jet head of FIG. 1. For example, it is suitable for air and non-air assisted ink jet heads. This purging capability facilitates the initial filling of dry ink jet heads, the filling of ink jet heads which contain some ink, storage of ink jet heads, purging of bubbles and other contaminants from ink jet heads and the transportation of such heads. For example, conventional ink jet heads, when filled with ink and shipped at high altitudes by airline, are somewhat prone to outgassing of air bubbles into the ink within such ink jet heads. These bubbles can be very difficult to purge and also interfere with the performance of the ink jet head. Consequently, conventional ink jet heads must be packed and shipped with extreme care. By providing an easily accomplished method and apparatus for purging bubbles, any bubbles ingested during storage and shipment of an ink jet head can readily be removed. In addition, the illustrated method and apparatus permits in situ purging of contaminants and air bubbles from ink jet heads without the need for removing the heads from an ink jet printer. This minimizes down time for such printers and makes the entire purging procedure much easier. Moreover, the purging operation can be accomplished in only a few seconds. Also, purging typically requires only a very small fraction of the volume of ink in ink cartridges commonly used with ink jet heads.

Figure 7:
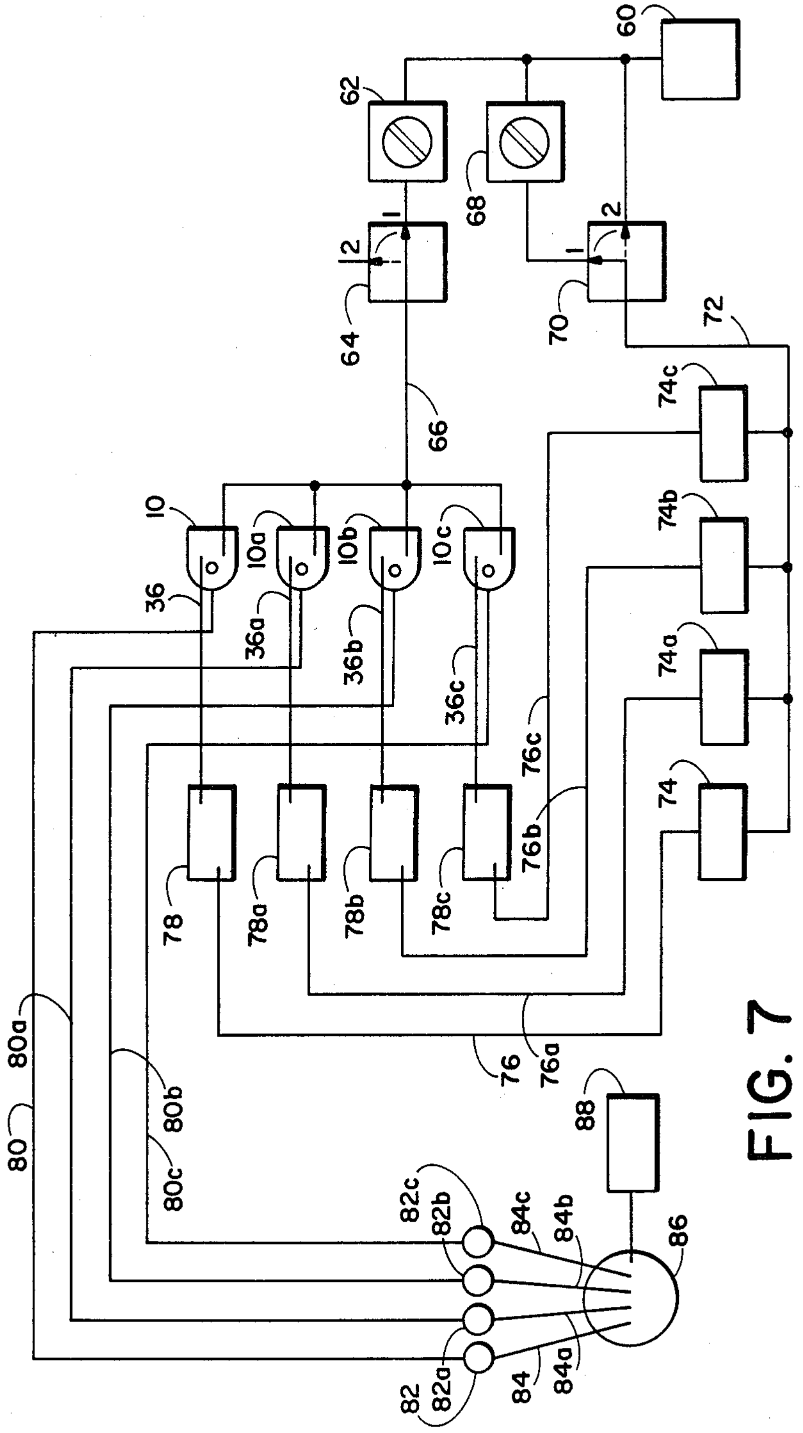
FIG. 7 is a schematic diagram of an array of ink jet heads of the type shown in FIG. 1, together with a contaminant and air bubble purging system controlled by the circuit of FIG. 6.

With reference to FIG. 7, an array of ink jet heads 10, 10*a*, 10*b* and 10*c*, such as the type in FIG. 1, are shown. During normal operation of this array, air under a positive pressure from an air pump 60 is delivered through a pressure regulator 62, through a closed solenoid controlled valve 64 (shown in a first position) to a line 66 and then to the air supply inlets of the respective ink jet heads. In addition, air from pump 60 passes through another regulator 68, through a solenoid controlled valve 70, through a line 72, and to the air pressure side of a set of conventional ink jet cartridges 74, 74*a*, 74*b* and 74*c*. Exemplary cartridges include those shown in U.S. Pat. No. 4,551,734 of Causley et al.

The ink delivery side of cartridge 74 is connected through a line 76, a conventional bubble trap 78 and to the ink supply inlet 36 of ink jet head 10. The ink supply sides of the cartridges 74*a*–74*c* are respectively coupled by lines 76*a*–76*c*, through bubble traps 78*a*–78*c*, and to the ink supply inlets 36*a*–36*c* of ink jet heads 10*a*–10*c*. The purging outlet of ink jet head 10 is coupled by a line 80 to one side of a normally closed purging valve 82. The other side of valve 82 is connected by a line 84 to a purging tank 86, which may be a closed vessel in which a vacuum is drawn by an optional vacuum pump 88. In the same manner, the purging outlets of the ink jet heads 10*a*–10*c* are connected by respective lines 80A–80C to solenoid controlled valves 82*a*–82*c*. These latter valves are connected by respective lines 84*a*–84*c* to the purging tank 86.

During one purging process in accordance with the invention, solenoid controlled valve 70 is shifted to a second position, shown in FIG. 7, so as to couple the air pump 60 to the line 72 and bypass the pressure regulator 68. This increases the pressure on ink in the ink cartridges 74–74*c*. An exemplary pressure increase is approximately four pounds-per-square-inch. This pressure increase produces a corresponding pressure increase at the respective ink supply inlets 36–36*c* and increases the pressure of the ink within the ink chambers of the ink jet heads. At the same time, although not necessarily so, the solenoid controlled valves 82–82*c* are opened to thereby open the purging outlets of each of the ink jet heads 10–10*c*. When this happens, ink flows from the ink supply inlet of each ink jet head, through the ink chambers and purging outlets of the heads, and to the purging tank 86. In addition, a small amount of ink, for example, approximately twenty percent of the mass flow, will pass through the orifice passageway 22 of each of the ink jet heads in addition to the ink which exits via the purging outlets. The resulting flow of ink through the ink chambers sweeps contaminants and bubbles from the chambers. Because the ink does not pass through a restricted orifice between the inlet and purging outlet, the velocity of ink flow through the ink chamber increases rapidly after purging is started and assists the purging process.

In addition, as previously explained, the FIG. 1 form of ink jet head has an ink supply passageway 38 and a purging passageway 40 at opposite ends of the ink chamber from one another. These passageways are positioned such that the ink flows in a non-linear path through the ink chamber during purging. This facilitates the sweeping of contaminants and bubbles from the ink chamber. As shown in FIG. 3, by introducing the ink tangentially into the ink chamber 14, the ink follows in a cyclone-like or vortical path through the ink chamber. This tends to sweep bubbles and contaminants clinging to the ink chamber walls from the ink chamber. In addition, by introducing the ink tangentially into the ink chamber and by removing the ink tangentially from the ink chamber, areas of low velocity ink flow or stagnation areas within the ink chamber are minimized. Consequently, areas of low dynamic pressure within the ink chamber are substantially eliminated during purging to enhance the effectiveness of the purging. Following purging for a few seconds, typically no more than from two to twenty seconds, valves 82–82*c* are closed to shut off the purging outlets. Valve 70 is also shifted to its first position so as to again deliver regulated air to the ink cartridges. During the purging operation, solenoid valve 64 may be shifted to its second position to vent air from line 66. This prevents the delivery of air to the air chambers of ink jet heads 10–10*c* during the purging operation.

In addition to, or typically instead of, elevating the pressure within the ink cartridges during purging, the following purging method may be employed. In this alternate approach, the vacuum pump 88 is employed to draw a vacuum, for example a negative four pounds-per-square-inch vacuum, in vessel 86. During purging, the valves 82–82*c* are opened so that this negative pressure is applied to the purging outlets of the ink jet heads 10–10*c*. At the same time, valve 64 may be moved to its vent position and valve 70 is typically left in the position shown in FIG. 7 so that a normal positive pressure exists at the ink inlet. Because of the negative pressure at the purging outlets, ink not only flows from the supply inlet of each ink jet head to the purging outlet, but the velocity of ink flow is increased. With this approach, very little ink typically flows through the ink orifice passageways. Consequently, the remote chance of forcing contaminants and bubbles into these passageways and clogging the ink jet heads during the purging operation is reduced.

As a further purging approach, an ink jet head which is wetted with fluid is drained through the purging outlet. When refilled, because the walls of the ink chamber are wetted (i.e. by ink or other fluid), removal of air bubbles during the purging operation is facilitated. For example, a dry ink jet head may be initially wetted and then purged in this manner. Alternately, an ink jet head which is wetted during normal operation may be drained and purged accordingly.

Figure 6:
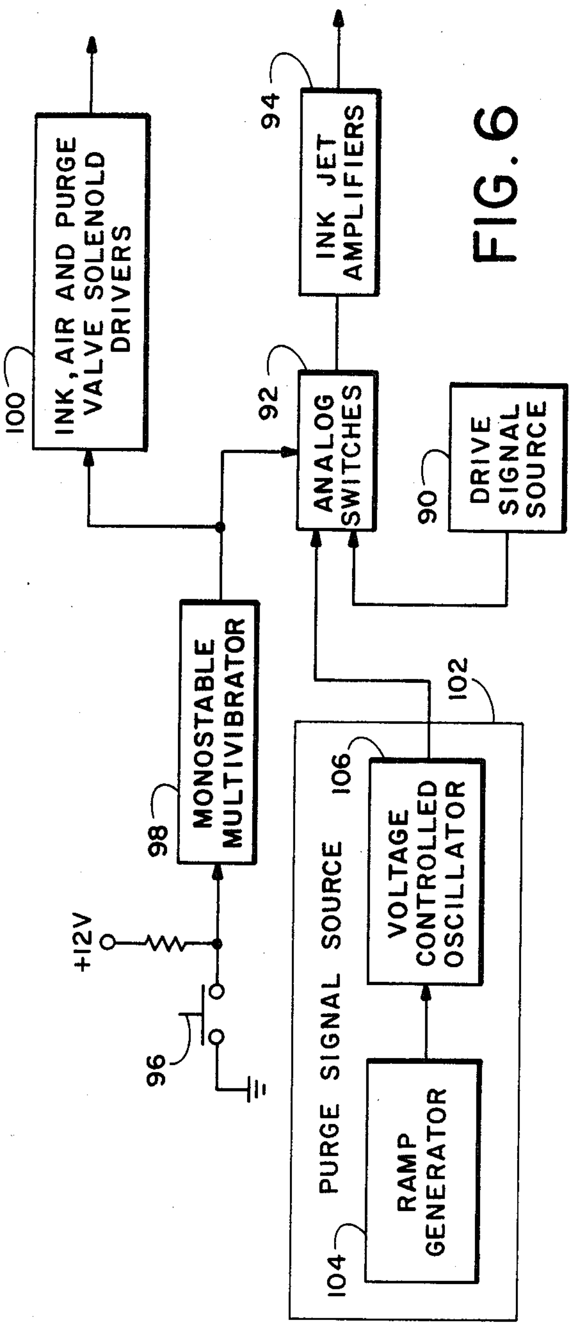
FIG. 6 is a block diagram of an electrical circuit which controls the purging of air bubbles and contaminants from the ink jet head of FIG. 1.

Turning to FIG. 6, during normal operation of an ink jet head, drive signals, such as sinusoidal signals, at a desired frequency are obtained from a conventional signal source 90. These signals are delivered through analog switches 92 and through ink jet amplifiers to the piezoelectric crystal of each ink jet head of an ink jet head array. To initiate a purging operation, a switch 96 is closed to trigger a monostable multivibrator 98. When triggered, the multivibrator 98 produces an output to ink and air valve solenoid drivers 100 and to the analog switches 92. While the monostable multivibrator is producing such an output signal, drivers 100 control the valves 64, 70 and 82–82*c* as previously explained to accomplish the purging operation. In addition, the analog switches 92 are controlled during this time to block the application of drive signals to the piezoelectric crystals of the ink jet heads from source 90. When the monostable multivibrator output signal ends, the valves return to their normal position so that normal operation of the ink jet heads resumes.

As an additional option, a purge signal source 102 may be provided. This source is coupled by the analog switches 92 to the ink jet amplifiers 94 during the purging operation. Purge signal source 102 comprises a ramp generator circuit 104 for applying a ramp voltage to a voltage controlled oscillator 106. In response to the ramp voltage output from the ramp generator, the voltage controlled oscillator produces a sinusoidal output which is varied from approximately five kilohertz to about one hundred kilohertz. This sweeping frequency signal, when applied to the piezoelectric crystals of the ink jet heads, causes any bubbles in the ink chamber to oscillate. Oscillation is enhanced when the applied frequency is at the natural resonance frequency of the bubbles. As the bubbles oscillate, they tend to break up and dislodge from the walls of the ink chamber. This makes the bubbles easier to sweep from the ink chamber during the purging operation. Again, the frequency of the applied purging signal is continuously varied over a range, as compared to applying a few isolated purging signal frequencies. Because of this, virtually any bubble of significant size within the ink chamber will be subjected to an applied signal at the natural resonance frequency of the bubble. Consequently, removal of the bubbles is enhanced. It should be emphasized that successful purging typically is accomplished by the previously described purging cycles without subjecting ink jet heads to a variable frequency purging signal. However, particularly when initially filling a dry ink jet head, in some cases the application of a variable frequency purging signal has removed bubbles that were not removed in the absence of such a signal.

Having illustrated and described the principles of our invention with reference to several preferred embodiments, it should be apparent to those persons skilled in the art that such invention may be modified in arrangement and detail without departing from such principles. We claim as our invention all such modifications as come within the true spirit and scope of the following claims.

We claim:

1. A method of purging air bubbles and contaminants from an ink jet head with a body having a wall which defines an internal ink chamber, an orifice passageway leading from the ink chamber through which pressure pulses are transmitted in response to electrical signals applied to a piezo-electric crystal which is in mechanical contact with ink in the ink chamber, an ink inlet through which ink is delivered, to the ink chamber, and a normally closed purging outlet through which ink is selectively removed from the ink chamber without passing through the orifice passageway, comprising:

opening the purging outlet; and, passing ink in a cyclone-like path from the ink inlet to the purging outlet; and closing the purging outlet.

2. A method according to claim 1 in which the ink jet head has an internal ink chamber which is generally circular in cross section, the ink inlet being adjacent one end of the ink chamber and the ink outlet being adjacent the other end of the ink chamber, and in which the step of passing ink comprises the step of passing ink in a tangential path through the ink chamber from the ink inlet to the purging outlet.

3. A method according to claim 2 including the step of varying the frequency of electrical signals applied to the piezoelectric crystal while the purging outlet is open.

4. A method according to claim 3 in which the step of varying the frequency comprises varying the frequency of the electrical signals through a range which includes frequencies of from approximately five kilohertz kilohertz to at least approxirmately one hundred kilohertz.

5. A method according to claim 1 in which the ink jet head is of the type wherein ink droplets from an ink droplet forming orifice outlet pass through an air chamber and then through an external ink jet head orifice, pressurized air being supplied to the air chamber to assist the exiting of ink droplets through the external ink jet head orifice, the method including the step of interrupting the flow of air to the air chamber at least during a portion of the time that ink is passed from the ink inlet to the purging outlet.

6. A method according to claim 1 in which ink at a first pressure is delivered to the ink chamber inlet while the purging outlet is closed and which includes the step of increasing the pressure of the delivered ink to a second pressure greater than the first pressure at least during a portion of the time that ink is passed from the ink inlet to the purging outlet.

7. A method according to claim 1 including the step of applying a positive pressure to the ink delivered to the ink chamber inlet at least during a portion of the time that ink is passed from the ink inlet to the purging outlet.

8. A method according to claim 1 including the step of applying a negative pressure to the purging outlet at least during a portion of the time that ink is passed from the ink inlet to the purging outlet.

9. A method according to claim 1 including the step of initially wetting the ink chamber wall.

10. An apparatus for purging air bubbles and contaminants from an ink jet head of the type with a body having a wall which defines an enlarged internal ink chamber having a longitudianl axis and first and second ends, an orifice passageway leading from the second end of the ink chamber through which pressure pulses are transmitted in response to electrical signals applied to a piezo-electric crystal which is in mechanical contact with the first end of the ink chamber and with ink in the ink chamber and an ink inlet through which ink is delivered to the ink chamber, the apparatus comprising:

a purging outlet through which ink is removed from the ink chamber, the ink inlet being positioned adjacent to the first end of the ink chamber, the purging outlet being positioned adjacent to the second end of the ink chamber, the ink inlet and purging outlet being located to communcate with one another along a path through the ink chamber which path does not include the orifice passageway; and valve means for selectively opening the purging outlet to permit the flow of ink from the ink inlet to the purging outlet.

11. An apparatus according to claim 10 including means for controlling the valve means from a location which is remote from the ink jet head.

12. An apparatus according to claim 10 including purging electrical signal generation means for applying electrical signals of a varying frequency to the piezoelectric crystal at least during a portion of the time that the purging outlet is open, the purging signal generator means includes variable voltage generator means for producing a variable voltage output, voltage controlled oscillator means having an input for receiving the variable voltage output and for generating an oscillator output of electrical signals of varying frequency, the apparatus also including means for selectively applying the oscillator output to the piezoelectric crystal during at least a portion of the time that the purging outlet is open.

13. An apparatus according to claim 10 including means for delivering ink at a first pressure to the ink chamber while the purging outlet is closed and including means for increasing the pressure of the ink delivered to the ink chamber to a second pressure which is greater than the first pressure during at least a portion of the time that the purging outlet is open.

14. An apparatus according to claim 10 including means for applying a negative pressure to the purging outlet at least during a portion of the time that the purging outlet is open.

15. An apparatus according to claim 10 in which the ink jet head is of the type which has an air chamber through which ink droplets from an ink drop-forming orifice outlet pass to an external ink jet head orifice, pressurized air being supplied to the air chamber to assist the passage of ink droplets from the external ink jet head orifice, the apparatus including means for selectively interrupting the flow of air to the air chamber at least during a portion of the time that ink is passed from the ink inlet to the purging outlet.

16. An apparatus according to claim 15 in which the ink jet head has a single compartment ink chamber bounded by an ink chamber wall, the ink chamber wall, the ink chamber having a longitudinal axis and a single ink droplet forming orifice passageway leading from the ink chamber to the air chamber, the cross section of the ink chamber wall in a direction normal to the longitudinal axis being circular, the ink inlet being oriented to introduce ink tangentially to the ink chamber wall such that the ink follows a circular swirling path from the ink inlet to the purging outlet when the purging outlet is open, the purging outlet having a cross section of approximately 9,300 $\mu m^2$ to 31,300 $\mu m^2$.

17. An ink jet head including a single compartment ink chamber which has an ink supply inlet for receiving ink under pressure, the ink chamber having an ink chamber wall with a valve free ink orifice pasasgeway leading to an internal ink drop-forming orifice outlet, the ink chamber also having an ink purging outlet through which ink is selectively removed to purge air bubbles and contaminants from the ink chamber, the ink supply inlet and ink purging outlet being located to communicate with one another along a path through the ink chamber which path does not include the ink orifice passageway, means for selectively opening the purging outlet to allow purging of air bubbles and contaminants through the ink chamber, an actuator which applies a pressure pulse to th ink chamber so as to cause ink to flow through the ink orifice passageway and produce an ink drop at the internal ink drop-forming orifice outlet, an air chamber with an air chamber wall through which an external ink jet head orifice is provided in axial alignment with the internal ink drop=-forming orifice outlet, the air chamber being adapted to receive pressurized air which flows inwardly from the sides of the air chamber to form a generally coaxial air stream surrounding the internal ink drop-forming orifice outlet and which air stream is directed out of the external ink jet head orifice, the air stream carrying ink drops produced at the internal ink drop-forming orifice outlet, in response to the pressure pulses, outwardly through the external ink jet head orifice and toward printing medium.

18. An ink jet head according to claim 17 in which the ink chamber is an enlarged hollow ink receiving chamber which is generally circular in cross section along at least a major portion of its length and in which the ink supply inlet is positioned at one end of the ink chamber and oriented to direct ink about the circumference of the ink chamber from the ink supply inlet to the ink purging outlet, the purging outlet being positioned at the other end of the ink chamber.

* * * * *